(12) United States Patent
Zhang et al.

(10) Patent No.: US 10,108,276 B2
(45) Date of Patent: Oct. 23, 2018

(54) MOUSE DEVICE

(71) Applicant: Primax Electronics Ltd., Taipei (TW)

(72) Inventors: Shi-Jie Zhang, Taipei (TW);
Chih-Feng Chien, Taipei (TW);
A-Ming Chang, Taipei (TW);
Ying-Che Tseng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/676,426

(22) Filed: Aug. 14, 2017

(65) Prior Publication Data

US 2018/0275778 A1    Sep. 27, 2018

(30) Foreign Application Priority Data

Mar. 24, 2017    (TW) .............................. 106109933 A (51) Int. Cl.
*G06F 3/0354*    (2013.01)
*G06F 3/03*    (2006.01)

(52) U.S. Cl.
CPC ........ *G06F 3/03543* (2013.01); *G06F 3/0317* (2013.01)

(58) Field of Classification Search
CPC .. G06F 3/0312; G06F 3/0317; G06F 3/03541; G06F 3/033; G06F 3/0354; G06F 3/03543; G06F 3/03544
See application file for complete search history.

(56) References Cited

U.S. PATENT DOCUMENTS

| | | | | |
|---|---|---|---|---|
| 4,497,410 A * | 2/1985 | Coate | ................ | B23Q 3/15506 211/1.53 |
| 6,042,524 A * | 3/2000 | Kato | ................ | B23Q 3/15526 483/13 |
| 2008/0039306 A1* | 2/2008 | Yang | ................ | B23Q 3/15713 483/42 |
| 2012/0172186 A1* | 7/2012 | Sun | ................ | B23Q 3/1572 483/68 |
| 2012/0256837 A1* | 10/2012 | Chang | ................ | G06F 3/03544 345/163 |
| 2014/0215105 A1* | 7/2014 | Chang | ................ | G06F 3/0317 710/62 |
| 2015/0138093 A1* | 5/2015 | Young | ................ | G06F 3/0312 345/166 |
| 2018/0210565 A1* | 7/2018 | Chang | ................ | G06F 3/0383 |

* cited by examiner

*Primary Examiner* — Benjamin C Lee
*Assistant Examiner* — Dong Hui Liang
(74) *Attorney, Agent, or Firm* — Kirton McConkie; Evan R. Witt (57) ABSTRACT

A mouse device includes a mouse casing, a first sensing module, a second sensing module and a switching module. The mouse casing includes a casing opening. Both of the first sensing module and the second sensing module are disposed on the switching module. Moreover, a part of the first sensing module and a part of the second sensing module are selectively exposed outside the casing opening. When the first sensing module or the second sensing module exposed outside the casing opening is rotated by the user, a switching body of the switching module is correspondingly rotated relative to the mouse casing. Consequently, a moving resolution of the mouse device is adjustable according to the practical requirements. The switching module has a simple mechanism for changing the moving resolution of the mouse device in a simple manner.

10 Claims, 7 Drawing Sheets

MOUSE DEVICE

FIELD OF THE INVENTION

The present invention relates to an input device, and more particularly to a mouse device for controlling the movement of a cursor.

BACKGROUND OF THE INVENTION

The widely-used input device of a computer includes for example a mouse device, a keyboard device, a trackball device, a touchpad device, or the like. Among these input devices, the mouse device is the most prevailing because it is very easy-to-use for most users. When a mouse device is held by the palm of a user, the user may move the mouse device to control the movement of a cursor shown on a display screen of a computer.

Figure 1:
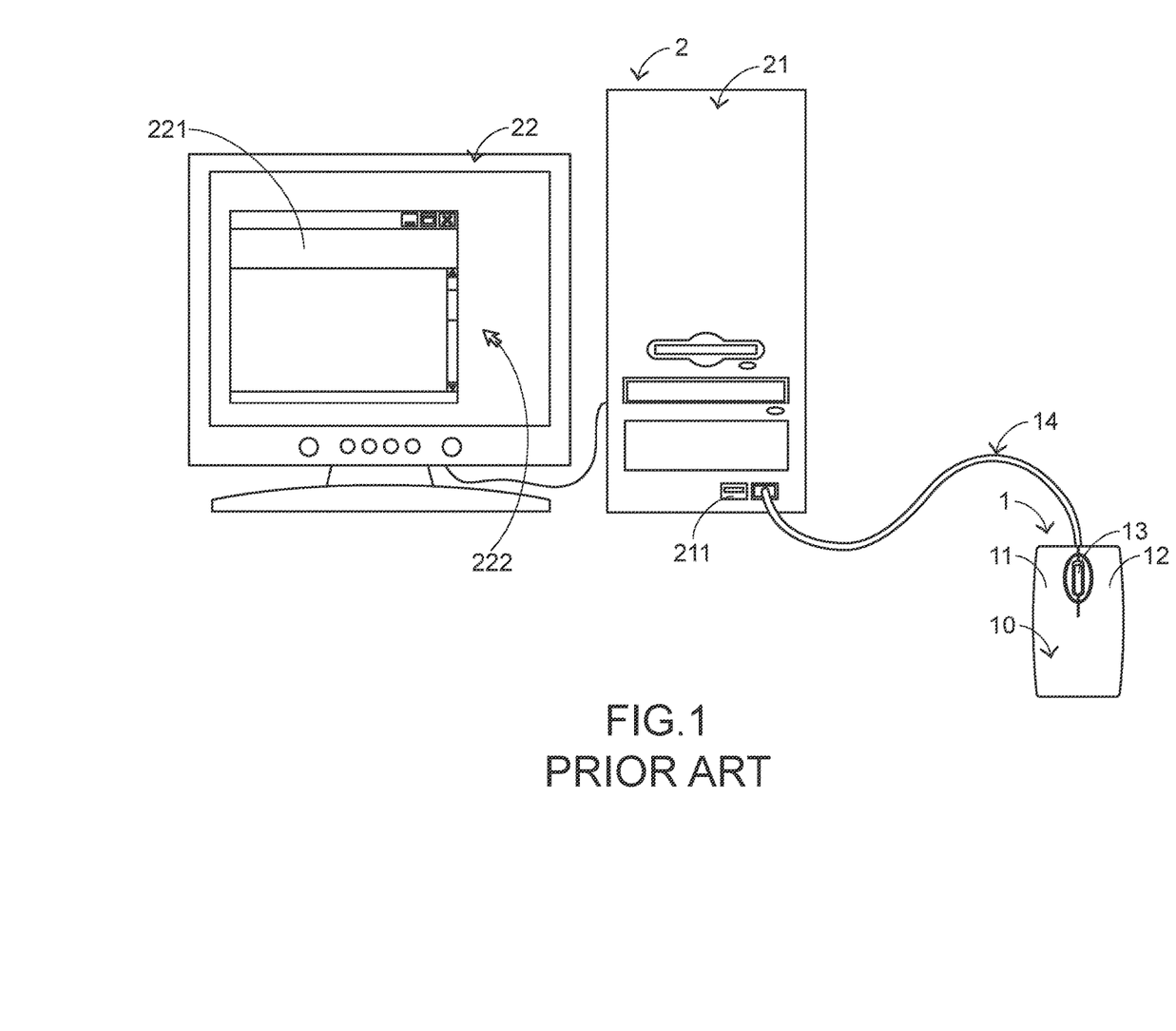
FIG. 1 is a schematic diagram illustrating the connection between a conventional mouse device and a computer system.

Hereinafter, the structure and the function of a conventional mouse device will be illustrated with reference to FIG. 1. FIG. 1 schematically illustrates the connection between a conventional mouse device and a computer system. The computer system 2 comprises a computer host 21 and a display screen 22. The computer host 21 is in communication with a mouse device 1 and the display screen 22. The computer host 21 has a connecting port 211. A graphic-based window 221 and a cursor 222 are shown on the display screen 22. The mouse device 1 is used for controlling the cursor 222 to have the computer host 21 execute a corresponding command. The mouse device 1 comprises a main body 10, a left button 11, a right button 12, a scroll wheel 13, and a connecting cable 14. The left button 11 is disposed on the main body 10 and located at a left side of the scroll wheel 13. In addition, the left button 11 is exposed outside the main body 10. By pressing down the left button 11, a left button signal is generated. Like the left button 11, the right button 12 is disposed on the main body 10 and located at a right side of the scroll wheel 13. By pressing down the right button 12, a right button signal is generated. The scroll wheel 13 is disposed within the main body 10 and partially exposed outside the main body 10. By rotating the scroll wheel 13, a corresponding scrolling signal is generated. The connecting cable 14 is connected with the main body 10 and protruded outside the main body 10. When the connecting cable 14 is connected with the connecting port 211, the communication between the mouse device 1 and the computer system 2 is established.

Figure 2:
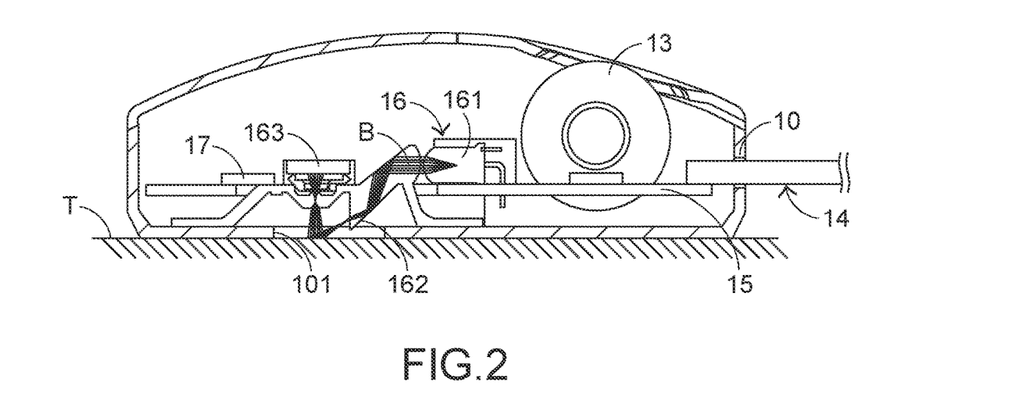
FIG. 2 is a schematic cross-sectional view illustrating the structure of the conventional mouse device.

The inner structure of the conventional mouse device will be described as follows. FIG. 2 is a schematic cross-sectional view illustrating the structure of the conventional mouse device. The main body 10 of the mouse device 1 is placed on a working surface T. The inner portion of the mouse device 1 comprises a main board 15, a sensing module 16 and a controlling unit 17. The sensing module 16 is disposed on the main board 15 and partially exposed to a bottom opening 101 of the main body 10. The sensing module 16 comprises a light-emitting element 161, an optical assembly 162 and an optical sensor 163. The light-emitting element 161 is disposed on the main board 15. Moreover, the light-emitting element 161 emits a light beam B. The optical assembly 162 is disposed within the main body 10. After the light beam B passes through the optical assembly 162, the light beam B is refracted by the optical assembly 162. Consequently, the light beam B is projected onto the working surface T, which is disposed under the main body 10. After the light beam B reflected by the working surface T is received by the optical sensor 163, a displacement signal is generated by the optical sensor 163 according to the light beam B. The control unit 17 is disposed on the main board 15 and electrically connected with the optical sensor 163.

The method of generating the displacement signal will be described as follows. When the mouse device 1 is placed on the working surface T but not moved, the light-emitting element 161 emits the light beam B. After the light beam B passes through the optical assembly 162, the light beam B is refracted by the optical assembly 162. Consequently, the light beam B is projected onto the working surface T. Then, the light beam B is reflected to the optical assembly 162 by the working surface T. After the light beam B passes through the optical assembly 162, the light beam B is received by the optical sensor 163. Meanwhile, the optical sensor 163 generates a first working surface image. When the mouse device 1 is placed on the working surface T and moved to a specified position, the light beam B from the first light-emitting element 161 is guided to the optical sensor 163 by the optical assembly 162, the working surface T and the optical assembly 162 sequentially. Meanwhile, the optical sensor 163 generates a second working surface image.

Then, the controlling unit 17 receives the first working surface image and the second working surface image from the optical sensor 163. According to the result of comparing the first working surface image with the second working surface image, the controlling unit 17 acquires a displacement amount of the main body 10 relative to the working surface T and generates a displacement signal according to the displacement amount. That is, when the mouse device 1 is moved on the working surface T, the sensing module 16 detects the displacement amount of the main body 10 relative to the working surface T and generates the displacement signal according to the displacement amount. After the displacement signal is received by the computer host 21, the movement of the cursor 222 on the display screen 22 is controlled by the computer host 21 according to the displacement signal.

With increasing development of mouse devices, the functions of the mouse devices are gradually increased. For example, the moving resolution of the mouse device is largely increased. The moving resolution of the mouse device denotes the sensitivity of moving the cursor of the computer host when the mouse device is moved for a certain distance. As the moving resolution is increased, the sensitivity of moving the cursor is increased. When the mouse device is used to operate the computer game, it is necessary to move the mouse device quickly. That is, the higher moving resolution of the mouse device is required. When the mouse device is used to perform a document processing task, the lower moving resolution of the mouse device is required. For preventing the user from frequently changing the suitable mouse device, a mouse device with a changeable moving resolution has been introduced into the market. This mouse device has a switching element for changing the moving resolution of the mouse device in response to the pressing action of the user. When the switching element is pressed down once, the moving resolution of the mouse device is changed. For example, the moving resolution is changed from 800 dots per inch (dpi) to 1600 dpi. When the switching element is pressed down again, the moving resolution is changed from 1600 dpi to 800 dpi. In other words, the moving resolution of the mouse device is changeable.

Although the moving resolution of the mouse device is changeable, there are still some drawbacks. For example, this mouse device cannot be applied to all kinds of working surfaces. In case that the working surface is made of a transparent material (e.g., acrylic resin), the light beam is transmissible through the working surface. Since the reflected portion of the light beam is reduced, the efficacy of generating the displacement signal is adversely affected.

Therefore, there is a need of providing a mouse device that has the adjustable moving resolution and is applicable to various working surfaces.

SUMMARY OF THE INVENTION

The present invention provides a mouse device that has the adjustable moving resolution and is applicable to various working surfaces.

In accordance with an aspect of the present invention, there is provided a mouse device. The mouse device is in communication with a computer system for controlling movement of a cursor of the computer system. The mouse device includes a mouse casing, a switching module, a main board, a first sensing module and a second sensing module. The mouse casing includes a casing opening and a supporting bracket. The casing opening is formed in a bottom part of the mouse casing and runs through the bottom part of the mouse casing. The supporting bracket is disposed on the bottom part of the mouse casing and disposed within the mouse casing. The switching module is disposed on the supporting bracket and located over the casing opening. The switching module is rotatable relative to the mouse casing. The main board is disposed within the mouse casing and electrically connected with the switching module. The first sensing module is disposed on a first side of the switching module. In response to rotation of the switching module, a part of the first sensing module is selectively exposed outside the casing opening. The second sensing module is disposed on a second side of the switching module. In response to rotation of the switching module, a part of the second sensing module is selectively exposed outside the casing opening. When one of the first sensing module and the second sensing module is exposed outside the casing opening under control of the switching module, a corresponding moving resolution of the mouse device is selected.

From the above descriptions, the mouse device of the present invention comprises plural sensing modules. The suitable sensing module corresponding to the selected moving resolution is used according to the corresponding requirement. The mechanical structure of the switching module cooperates with the simple detecting element and the controlling unit to achieve the function of switching the sensing module. Consequently, the mouse device of the present invention is simple and cost-effective. Moreover, the first sensing module, the second sensing module and the third sensing module are different kinds of sensing modules. Consequently, these sensing modules are suitably used for different kinds of working surfaces. In addition to the selection of the suitable moving resolution, the suitable sensing module of the mouse device can be selected to comply with the corresponding working surface. In other words, the moving resolution of the mouse device is adjustable, and the mouse device is suitably operated on various working surfaces.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks of the conventional technologies, the present invention provides a mouse device.

Figure 3:
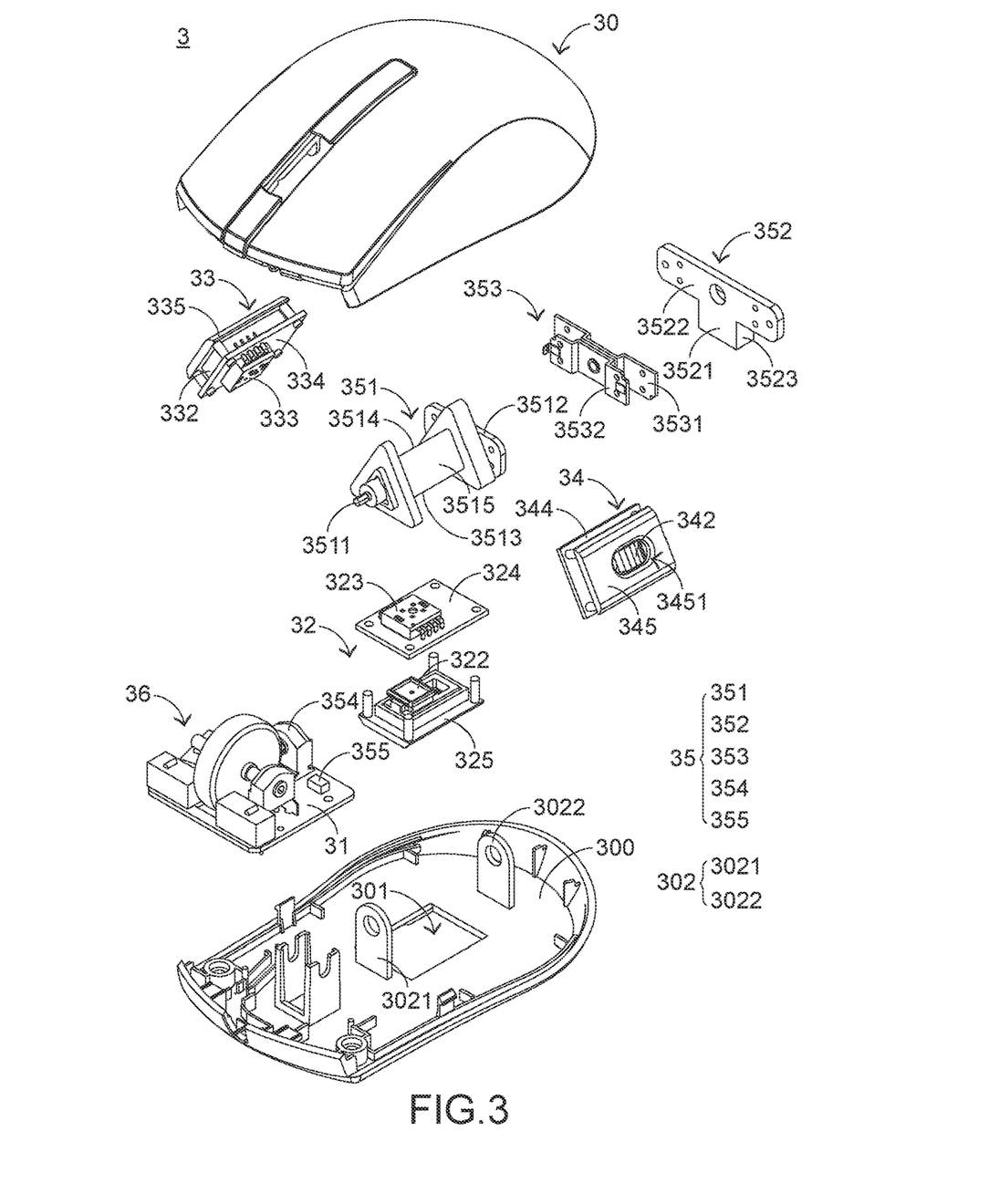
FIG. 3 is a schematic exploded view illustrating a mouse device according to an embodiment of the present invention.
Figure 4:
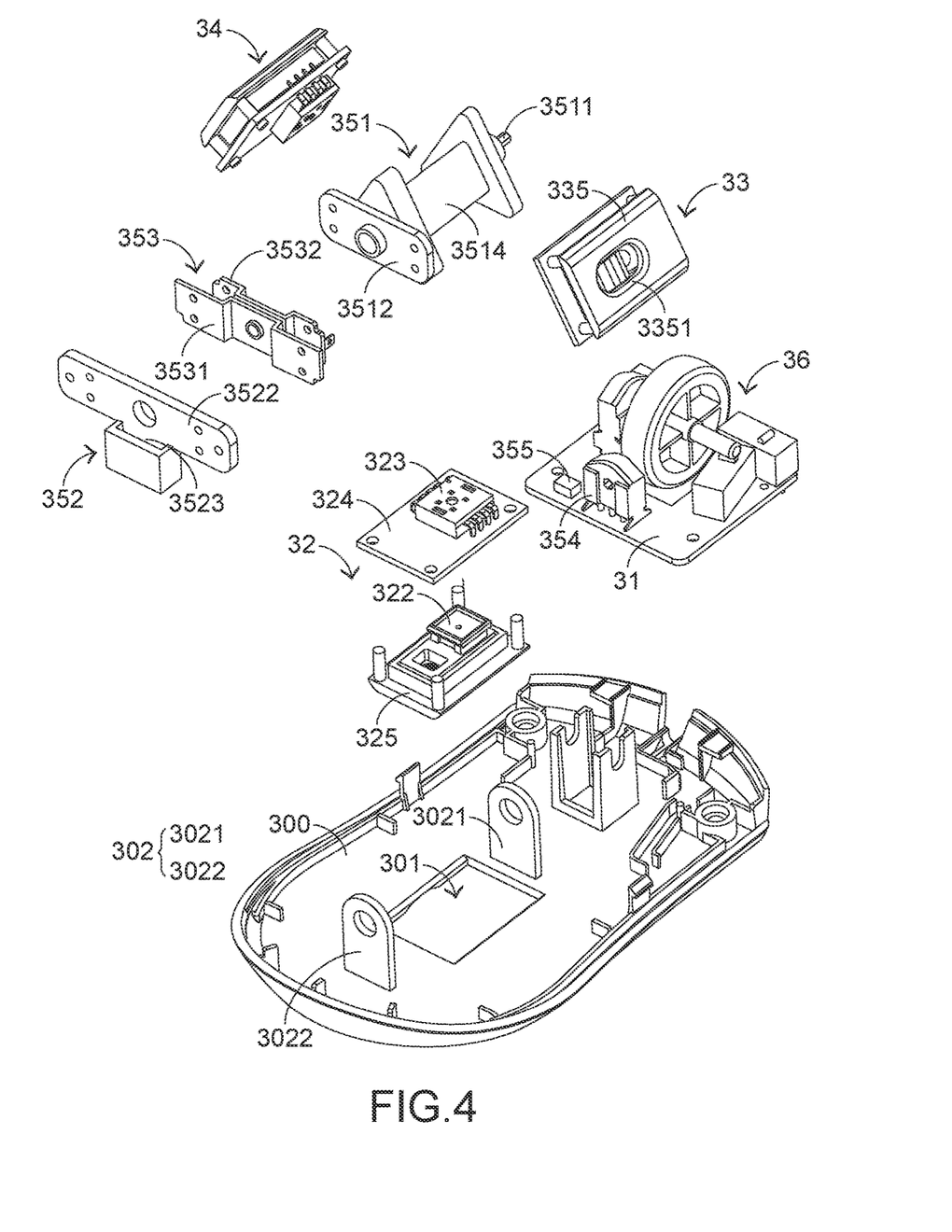
FIG. 4 is a schematic exploded view illustrating a portion of the mouse device according to the embodiment of the present invention and taken along another viewpoint.
Figure 5:
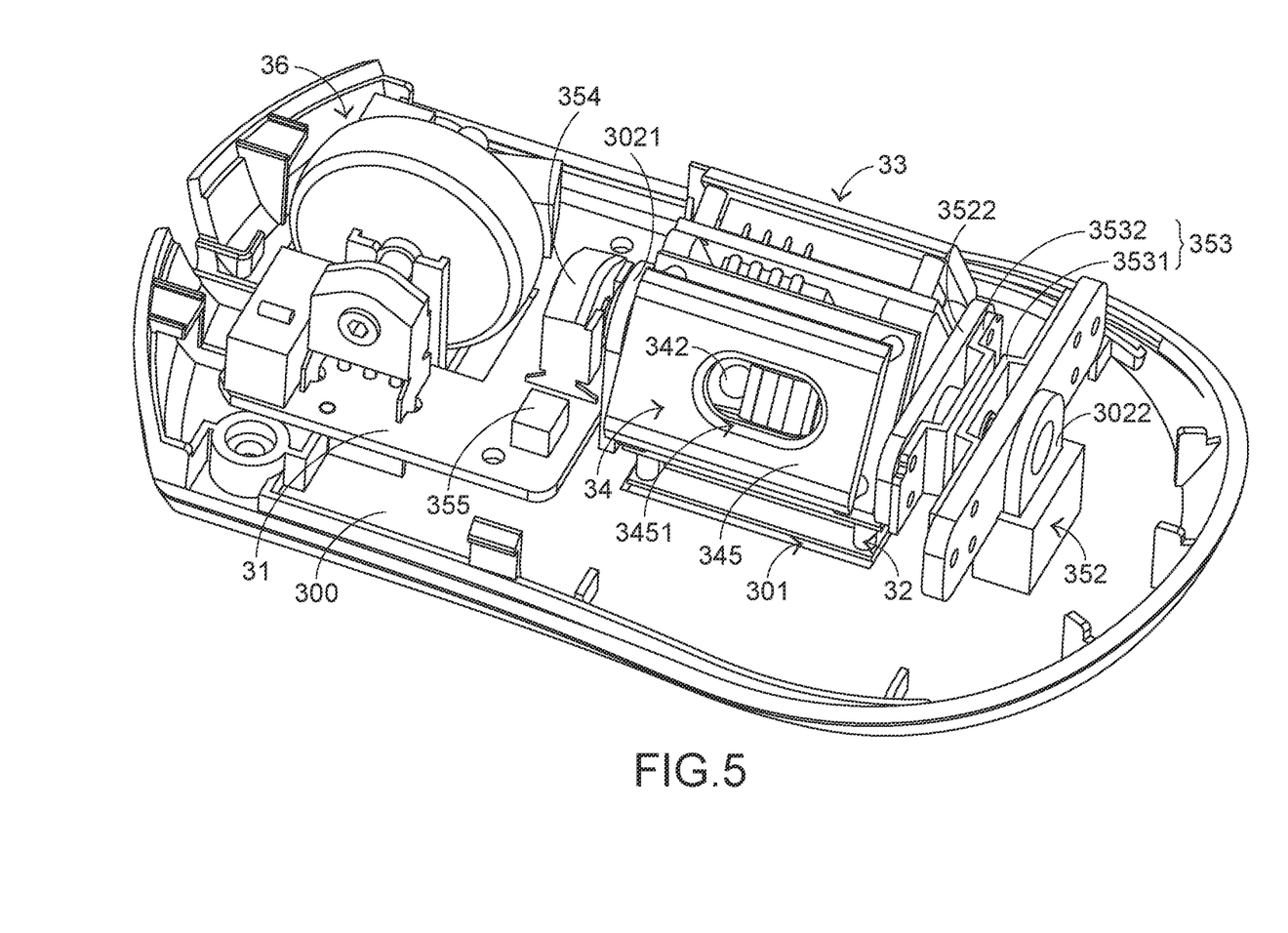
FIG. 5 is a schematic perspective view illustrating the mouse device according to the embodiment of the present invention and taken along a further viewpoint.

Hereinafter, the structure of the mouse device of the present invention will be illustrated with reference to FIGS. 3, 4 and 5. FIG. 3 is a schematic exploded view illustrating a mouse device according to an embodiment of the present invention. FIG. 4 is a schematic exploded view illustrating a portion of the mouse device according to the embodiment of the present invention and taken along another viewpoint. FIG. 5 is a schematic perspective view illustrating the mouse device according to the embodiment of the present invention and taken along a further viewpoint. The mouse device 3 is in communication with a computer system (not shown). Moreover, the mouse device 3 can control the movement of a cursor (not shown) of the computer system. In this embodiment, the mouse device 3 comprises a mouse casing 30, a main board 31, a first sensing module 32, a second sensing module 33, a third sensing module 34, a switching module 35 and an operation module 36. The mouse casing 30 comprises a casing opening 301 and a supporting bracket 302. The casing opening 301 is formed in a bottom part 300 of the mouse casing 30. Moreover, the casing opening 301 runs through the bottom part 300 of the mouse casing 30. The supporting bracket 302 is disposed on the bottom part 300 of the mouse casing 30 and disposed within the mouse casing 30. The supporting bracket 302 comprises a first supporting post 3021 and a second supporting post 3022. The first supporting post 3021 is disposed on the bottom part 300 of the mouse casing 30 and located near a first side of the casing opening 301. The second supporting post 3022 is disposed on the bottom part 300 of the mouse casing 30 and located near a second side of the casing opening 301. The switching module 35 is disposed on the supporting bracket 302 and located over the casing opening 301. Moreover, the switching module 35 is rotatable relative to the mouse casing 30. The main board 31 is disposed within the mouse casing 30 and electrically connected with the switching module 35. The operation module 36 comprises a left button, a right button and a scroll wheel. These components are disposed on the main board 31. The structures of these components are similar to those of the conventional mouse device, and are not redundantly described herein. In an embodiment, the main board 31 is a printed main board (PCB).

The first sensing module 32 is disposed on a first side of the switching module 35. In response to rotation of the switching module 35, a part of the first sensing module 32 is selectively exposed outside the casing opening 301. Similarly, the second sensing module 33 is disposed on a second side of the switching module 35. In response to rotation of the switching module 35, a part of the second sensing module 33 is selectively exposed outside the casing opening 301. Similarly, the third sensing module 34 is disposed on a third side of the switching module 35. In response to rotation of the switching module 35, a part of the third sensing module 34 is selectively exposed outside the casing opening 301. When one of the first sensing module 32, the second sensing module 33 and the third sensing module 34 is exposed outside the casing opening 301, the moving resolution of the mouse device 3 is correspondingly adjusted through the switching module 35. The operations of the switching module 35 will be described as follows.

Please refer to FIGS. 3, 4 and 5 again. The switching module 35 comprises a switching body 351, a fixing pedestal 352, a rotary element 353, a detecting element 354 and a controlling unit 355. The switching body 351 is disposed within the mouse casing 30 and located over the casing opening 301. As the switching body 351 is rotated by the user, the switching body 351 is rotated relative to the mouse casing 30. The fixing pedestal 352 is fixed on the second supporting post 3022 of the supporting bracket 302. In an embodiment, the fixing pedestal 352 comprises a pedestal body 3521 and a connecting part 3522. Moreover, the pedestal body 3521 comprises a fixing recess 3523. The second supporting post 3022 is penetrated through the fixing recess 3523. Consequently, the fixing pedestal 352 is sheathed around the second supporting post 3022 through the fixing recess 3523. The connecting part 3522 is connected with the pedestal body 3521. Moreover, the pedestal body 3521 is connected with the rotary element 353. Consequently, the rotary element 353 is fixed on the fixing pedestal 352.

Please refer to FIGS. 3 and 5. A first end 3511 of the switching body 351 is penetrated through the first supporting post 3021. The fixing pedestal 352 is sheathed around the second supporting post 3022. Consequently, the switching body 351 is fixed within the mouse casing 30 and rotatable relative to the mouse casing 30.

The rotary element 353 is connected with the switching body 351 and the fixing pedestal 352. As the switching body 351 is rotated, the rotary element 353 is correspondingly rotated. In an embodiment, the rotary element 353 comprises a first slab 3531 and a second slab 3532. The first slab 3531 is fixed on the connecting part 3522. The second slab 3532 is fixed on a second end 3512 of the switching body 351 and rotatable relative to the first slab 3531. As the switching body 351 is rotated relative to the mouse casing 30, the second slab 3532 is rotated relative to the first slab 3531 in response to the rotation of the second end 3512 of the switching body 351. In an embodiment, the rotary element 353 is a hinge structure, and the rotating angle of the second slab 3532 relative to the first slab 3531 is limited to be about 180 degrees.

The detecting element 354 is disposed on the main board 31 and located at an edge of the main board 31. The detecting element 354 is connected with the first end 3511 of the switching body 351. Moreover, the detecting element 354 is used for detecting a rotating status of the switching body 351 and generating a corresponding detecting signal. The first end 3511 of the switching body 351 is penetrated through the first supporting post 3021 and inserted into the detecting element 354. As the first end 3511 of the switching body 351 is rotated within the detecting element 354, the first end 3511 of the switching body 351 can be detected by the detecting element 354. The controlling unit 355 is disposed on the main board 31 and electrically connected with the detecting element 354, the first sensing module 32, the second sensing module 33 and the third sensing module 34. According to the detecting signal, the controlling unit 355 controls the operations of the first sensing module 32, the second sensing module 33 and the third sensing module 34. Moreover, a first status value, a second status value and a third status value are previously stored in the controlling unit 355. When the detecting signal corresponding to the first status value is received by the controlling unit 355, the operations of the first sensing module 32, the second sensing module 33 and the third sensing module 34 are controlled by the controlling unit 355 according to the first status value. In an embodiment, the detecting element 354 is an encoder.

Figure 6:
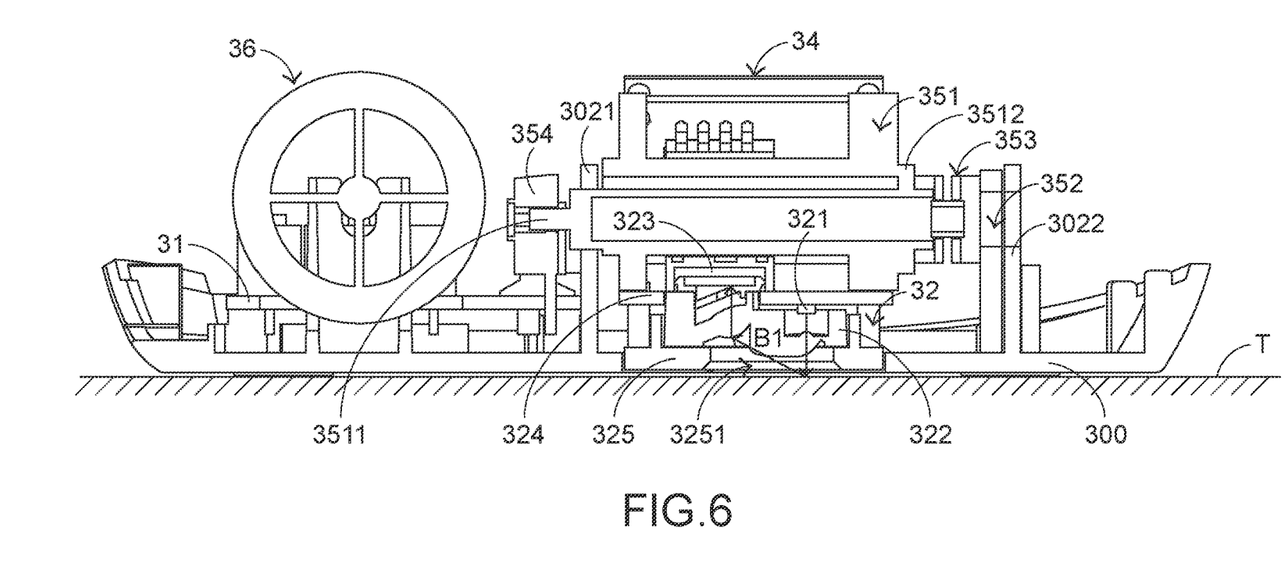
FIG. 6 is a schematic cross-sectional view illustrating a portion of the mouse device according to the embodiment of the present invention.

The structures of the first sensing module 32, the second sensing module 33 and the third sensing module 34 will be described with reference to FIGS. 3, 4 and 6. FIG. 6 is a schematic cross-sectional view illustrating a portion of the mouse device according to the embodiment of the present invention. The first sensing module 32 comprises a first light-emitting element 321, a first optical lens 322, a first optical sensor 323, a first circuit board 324 and a first cover 325. The second sensing module 33 comprises a second light-emitting element (not shown), a second optical lens 332, a second optical sensor 333, a second circuit board 334 and a second cover 335. The third sensing module 34 comprises a third light-emitting element (not shown), a third optical lens 342, a third optical sensor 343, a third circuit board 344 and a third cover 345. In FIG. 6, the detailed structure of the first sensing module 32 is shown. That is, the first sensing module 32 will be taken as an example for illustration. The first circuit board 324 is disposed on a first surface 3513 of the switching body 351. The first cover 325 is fixed on the first circuit board 324 to cover the first circuit board 324. The first cover 325 has a first hole 3251. The first light-emitting element 321 is disposed on the first circuit board 324 and electrically connected with the controlling unit 355. Moreover, the first light-emitting element 321 emits a first light beam B1. The first optical lens 322 is disposed on the first cover 325 and exposed outside the first hole 3251. The first light beam B1 can pass through the first optical lens 322. The first optical sensor 323 is disposed on the first circuit board 324 and electrically connected with the controlling unit 355. After the first light beam B1 passing through the first optical lens 322 is received by the first optical sensor 323, a working surface image is generated.

The following two aspects should be specially described. Firstly, the first circuit board 324 may be fixed on the first surface 3513 of the switching body 351 in a hot melt manner, a screwing manner or any other appropriate coupling manner. The first cover 325 is fixed on the first circuit board 324 in any appropriate coupling manner. After the components of the first sensing module 32 are combined together, the first sensing module 32 is installed on the first surface 3513 of the switching body 351 through the connection of the first circuit board 324 and the switching body 351. Secondly, the structures of the second cover 335 and the third cover 345 are similar to those of the first cover 325. For example, the second cover 335 has a second hole 3351, and the third cover 345 has a third hole 3451.

Except for the following two items, the structures of the second sensing module 33 and the third sensing module 34 are similar to those of the first sensing module 32. Firstly, the second circuit board 334 of the second sensing module 33 is disposed on a second surface 3514 of the switching body 351, and the third circuit board 344 of the third sensing module 34 is disposed on a third surface 3515 of the switching body 351. Secondly, the first light-emitting element 321 of the first sensing module 32 is a visible light source, the second light-emitting element of the second sensing module 33 is an invisible light source, and the third light-emitting element of the third sensing module 34 is a laser light source. In other words, the first sensing module 32 is a visible sensing module, the second sensing module 33 is an invisible laser sensing module, and the third sensing module 34 is a laser sensing module. The other structures of the second sensing module 33 and the third sensing module 34 are similar to those of the first sensing module 32, and are not redundantly described herein.

Figure 7:
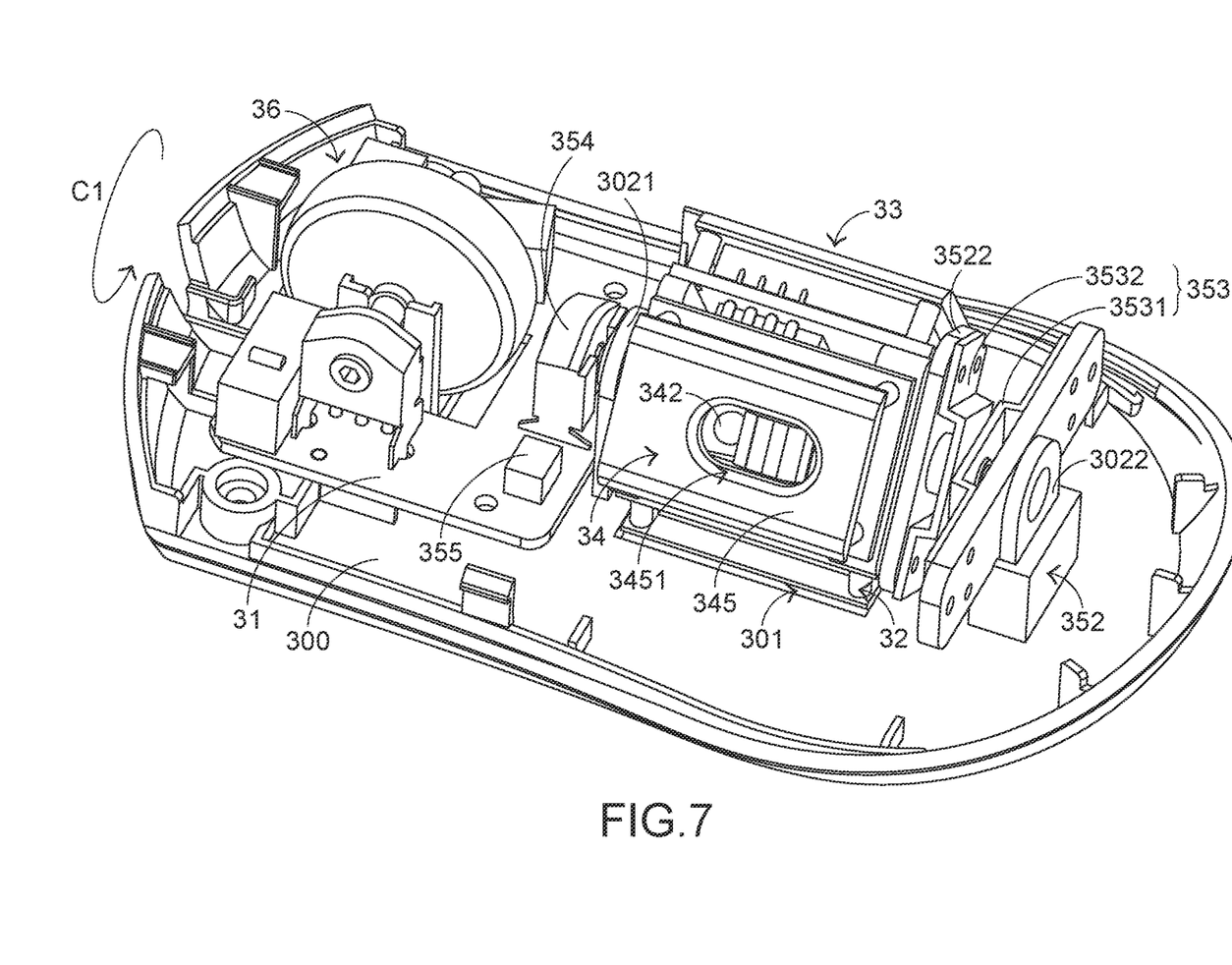
FIG. 7 is a schematic perspective view illustrating a portion of the switching module of the mouse device according to the embodiment of the present invention.

The method of changing the operations status of the mouse device 3 through the switching module 35 will be described as follows. Please refer to FIGS. 3, 4 and 7. FIG. 7 is a schematic perspective view illustrating a portion of the switching module of the mouse device according to the embodiment of the present invention. When the mouse device 3 is used to perform the task requiring a high moving resolution, the user may rotate the first cover 325 in a first rotating direction C1 through the casing opening 301. Since the switching body 351 is connected with the first sensing module 32, the switching body 351 is rotated relative to the mouse casing 30 in the first rotating direction C1. As the switching body 351 is rotated relative to the mouse casing 30, the second end 3512 of the switching body 351 is correspondingly rotated. In response to the rotation of the second end 3512 of the switching body 351, the second slab 3532 is rotated relative to the first slab 3531. While the switching body 351 is rotated, the first end 3511 of the switching body 351 is rotated within the detecting element 354 and thus the rotating status of the switching body 351 is read by the detecting element 354. Consequently, the detecting element 354 is triggered to generate the detecting signal corresponding to the third status value (e.g., 3). Moreover, the detecting signal is transmitted from the detecting element 354 to the controlling unit 355. According to the third status value, the controlling unit 355 enables the third sensing module 34 and controls the first sensing module 32 and the second sensing module 33 to enter a hibernation mode. Under this circumstance, the mouse device 3 is in an operation mode corresponding to a high moving resolution. Under control of the switching module 35, the third cover 345 is aligned with the casing opening 301. Meanwhile, the third sensing module 34 is exposed outside the casing opening 301.

In case that the working surface T is changed and the second sensing module 33 is suitable for the working surface T, the above process may be performed. That is, under control of the switching module 35, the second sensing module 33 of the mouse device 3 is exposed outside the casing opening 301. For example, the user may rotate the third cover 345 in the first rotating direction C1 through the casing opening 301. Since the switching body 351 is connected with the third sensing module 34, the switching body 351 is rotated relative to the mouse casing 30 in the first rotating direction C1. As the switching body 351 is rotated relative to the mouse casing 30, the second end 3512 of the switching body 351 is correspondingly rotated. In response to the rotation of the second end 3512 of the switching body 351, the second slab 3532 is rotated relative to the first slab 3531. While the switching body 351 is rotated, the first end 3511 of the switching body 351 is rotated within the detecting element 354 and thus the rotating status of the switching body 351 is read by the detecting element 354. Consequently, the detecting element 354 is triggered to generate the detecting signal corresponding to the second status value (e.g., 2). Moreover, the detecting signal is transmitted from the detecting element 354 to the controlling unit 355. According to the second status value, the controlling unit 355 enables the second sensing module 33 and controls the first sensing module 32 and the third sensing module 34 to enter the hibernation mode. Under this circumstance, the second sensing module 33 is suitable for the working surface T is normally operated. The way of enabling the first sensing module 32 is similar to that mentioned above, and is not redundantly described herein.

In an embodiment, the switching body 351 and the second end 3512 of the switching body 351 have hollow structures. The wires (not shown) connected with the first circuit board 324, the second circuit board 334 and the third circuit board 344 can be accommodated within the hollow structures. Moreover, the wires are penetrated through a hole of the second supporting post 3022. Consequently, the circuitry installations of the first circuit board 324, the second circuit board 334 and the third circuit board 344 are completed. Since the wires are stored within the axial center of the switching body 351, the wires are not rotated with the switching body 351 in response to the rotation of the switching body 351. Since the wires are not rotated, the wires are not damaged in response to excessive rotation.

From the above descriptions, the mouse device of the present invention comprises plural sensing modules. The suitable sensing module corresponding to the selected moving resolution is used according to the corresponding requirement. The mechanical structure of the switching module cooperates with the simple detecting element and the controlling unit to achieve the function of switching the sensing module. Consequently, the mouse device of the present invention is simple and cost-effective. Moreover, the first sensing module, the second sensing module and the third sensing module are different kinds of sensing modules. Consequently, these sensing modules are suitably used for different kinds of working surfaces. In addition to the selection of the suitable moving resolution, the suitable sensing module of the mouse device can be selected to comply with the corresponding working surface. In other words, the moving resolution of the mouse device is adjustable, and the mouse device is suitably operated on various working surfaces.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device in communication with a computer system for controlling movement of a cursor of the computer system, the mouse device comprising:

a mouse casing comprising a casing opening and a supporting bracket, wherein the casing opening is formed in a bottom part of the mouse casing and runs through the bottom part of the mouse casing, and the supporting bracket is disposed on the bottom part of the mouse casing and disposed within the mouse casing;

a switching module disposed on the supporting bracket and located over the casing opening, wherein the switching module is rotatable relative to the mouse casing;

a main board disposed within the mouse casing and electrically connected with the switching module;

a first sensing module disposed on a first side of the switching module, wherein in response to rotation of the switching module, a part of the first sensing module is selectively exposed outside the casing opening; and a second sensing module disposed on a second side of the switching module, wherein in response to rotation of the switching module, a part of the second sensing module is selectively exposed outside the casing opening, wherein when one of the first sensing module and the second sensing module is exposed outside the casing opening under control of the switching module, a corresponding moving resolution of the mouse device is selected.

2. The mouse device according to claim 1, wherein the switching module comprises:

a switching body disposed within the mouse casing and located over the casing opening, wherein the switching body is rotatable relative to the mouse casing;

a fixing pedestal fixed on the supporting bracket;

a rotary element connected with the switching body and the fixing pedestal, and rotated with the switching body;

a detecting element disposed on the main board and connected with a first end of the switching body, wherein when a rotating status of the switching body is detected by the detecting element, a detecting signal is generated by the detecting element; and a controlling unit disposed on the main board and electrically connected with the detecting element, the first sensing module and the second sensing module, wherein the controlling unit controls operations of the first sensing module and the second sensing module according to the detecting signal.

3. The mouse device according to claim 2, wherein the supporting bracket comprises:

a first supporting post disposed on the bottom part of the mouse casing and located near a first side of the casing opening; and a second supporting post disposed on the bottom part of the mouse casing and located near a second side of the casing opening, wherein a first end of the switching body is penetrated through the first supporting post, and the fixing pedestal is sheathed around the second supporting post, so that the switching body is rotatable relative to the mouse casing.

4. The mouse device according to claim 3, wherein the fixing pedestal comprises:

a pedestal body comprising a fixing recess, wherein the second supporting post is penetrated through the fixing recess, and the fixing pedestal is sheathed around the second supporting post through the fixing recess; and a connecting part connected with the pedestal body, wherein the connecting part is connected with the rotary element, so that the rotary element is fixed on the fixing pedestal.

5. The mouse device according to claim 2, wherein the first sensing module comprises:

a first circuit board disposed on a first surface of the switching body;

a first cover, wherein the first circuit board is covered by the first cover, and the first cover has a first hole;

a first light-emitting element disposed on the first circuit board, and emitting a first light beam;

a first optical lens disposed on the first cover, and exposed outside the first hole, wherein the first light beam passes through the first optical lens; and a first optical sensor disposed on the first circuit board, wherein the first light beam passing through the first optical lens is received by the first optical sensor.

6. The mouse device according to claim 5, wherein the mouse device is placed on a working surface, wherein when the switching body is rotated relative to the mouse casing and the first cover of the first sensing module is exposed outside the casing opening, the first light beam passing through the first optical lens is projected onto the working surface and reflected to the first optical lens by the working surface, wherein when the light beam reflected by the working surface is received by the optical sensor through the first optical lens, a working surface image is generated.

7. The mouse device according to claim 2, wherein the rotary element comprises:

a first slab connected with the connecting part; and a second slab fixed on a second end of the switching body and rotatable relative to the first slab, wherein as the switching body is rotated relative to the mouse casing, the second slab is rotated relative to the first slab in response to rotation of the second end of the switching body.

8. The mouse device according to claim 2, wherein the second sensing module comprises:

a second circuit board disposed on a second surface of the switching body;

a second cover, wherein the second circuit board is covered by the second cover, and the second cover has a second hole;

a second light-emitting element disposed on the second circuit board, and emitting a second light beam;

a second optical lens disposed on the second cover, and exposed outside the second hole, wherein the second light beam passes through the second optical lens; and a second optical sensor disposed on the second circuit board, wherein the second light beam passing through the second optical lens is received by the second optical sensor.

9. The mouse device according to claim 2, wherein a first status value and a second status value are previously stored in the controlling unit, wherein when the controlling unit receives the detecting signal corresponding to the first status value, the controlling unit enables the first sensing module and controls the second sensing module to enter a hibernation mode, wherein when the controlling unit receives the detecting signal corresponding to the second status value, the controlling unit enables the second sensing module and controls the first sensing module to enter the hibernation mode.

10. The mouse device according to claim 2, wherein the detecting element is an encoder.

* * * * *